US007335318B2

(12) United States Patent
Asahara et al.

(10) Patent No.: US 7,335,318 B2
(45) Date of Patent: Feb. 26, 2008

(54) METHOD FOR MANUFACTURING WHOLLY AROMATIC LIQUID-CRYSTALLINE POLYESTER RESIN

(75) Inventors: Motoki Asahara, Sanda (JP); Toshiki Nishino, Sanda (JP)

(73) Assignee: Kabushiki Kaisha Ueno Seiyaku Oyo Kenkyujo, Osaka (JP)

( * ) Notice: Subject to any disclaimer, the term of this patent is extended or adjusted under 35 U.S.C. 154(b) by 259 days.

(21) Appl. No.: 11/245,200

(22) Filed: Oct. 7, 2005

(65) Prior Publication Data
US 2006/0084747 A1    Apr. 20, 2006

(30) Foreign Application Priority Data
Oct. 7, 2004    (JP) .............................. 2004-294565

(51) Int. Cl.
C09K 19/52    (2006.01)
C09K 19/20    (2006.01)
C09K 19/38    (2006.01)
C08G 63/181   (2006.01)
C08G 63/191   (2006.01)
C08L 67/00    (2006.01)

(52) U.S. Cl. .......................... 252/299.01; 252/299.67; 528/275; 528/286

(58) Field of Classification Search ........... 252/299.01, 252/299.67; 528/275, 286
See application file for complete search history.

(56) References Cited

U.S. PATENT DOCUMENTS

| 4,429,105 | A  |    | 1/1984  | Charbonneau |
| 4,612,360 | A  |    | 9/1986  | Ort |
| 6,114,492 | A  |    | 9/2000  | Linstid, III et al. |
| 6,306,946 | B1 |    | 10/2001 | Long et al. |
| 6,802,989 | B1 | *  | 10/2004 | Ueno et al. ............ 252/299.01 |
| 6,984,712 | B2 | *  | 1/2006  | Ueno et al. ............... 528/206 |
| 2002/0017631 | A1 |  | 2/2002  | Maeda et al. |
| 2003/0008979 | A1 |  | 1/2003  | Suenaga et al. |

FOREIGN PATENT DOCUMENTS

| EP | 0 850 968 A1 | 7/1998 |
| EP | 0 856 536 A2 | 8/1998 |
| EP | 1 184 401 A1 | 3/2002 |
| EP | 1 195 398 A1 | 4/2002 |
| JP | 2-51524 A    | 2/1990 |
| JP | 8-53605 A    | 2/1996 |
| JP | 08-165441 *  | 6/1996 |
| JP | 10-316873 A  | 12/1998 |
| JP | 11-199761 A  | 7/1999 |
| JP | 2002-201344 * | 7/2002 |
| JP | 2003-160716 A | 6/2003 |
| WO | WO 01/81449 A1 | 11/2001 |

OTHER PUBLICATIONS

English translation by computer for JP 2002-201344, http://www4.ipdl.inpit.go.jp/Tokujitu/PAJdetail.ipdl?N0000=60&N0120=01&N2001=2&N3001=2002-201344.*
English translation by computer for JP 08-165411, http://www4.ipdl.inpit.go.jp/Tokujitu/PAJdetail.ipdl?N0000=60&N0120=01&N2001=2&N3001=H08-165411.*
English translation by computer for JP 08-053605, http://www4.ipdl.inpit.go.jp/Tokujitu/PAJdetail.ipdl?N0000=60&NO120=01&N2001=2&N3001=H08-053605.*
English translation by computer for JP 10-316873, http://www4.ipdl.inpit.go.jp/Tokujitu/PAJdetail.ipdl?N0000=60&NO120=01&N2001=2&N3001=H08-316873.*
DATABASE WPI Section Ch, Week 199940 Derwent Publications Ltd., London, GB; Class A32, AN 1999-337705 XP002361613-& JP 11 199761 A (POLYPLASTICS KK) Jul. 27, 1999.

* cited by examiner

Primary Examiner—Shean C Wu
(74) Attorney, Agent, or Firm—Sughrue Mion, PLLC

(57) ABSTRACT

The present invention provides a method for manufacturing a wholly aromatic liquid-crystalline polyester resin comprising the steps of:
1) acylating the hydroxy group of major monomer components selected from the group consisting of aromatic hydroxycarboxylic acid, aromatic diol and aromatic dicarboxylic acid, with an acylating agent, provided that said major monomer components comprise at least one of aromatic hydroxycarboxylic acid and aromatic diol; and
2) polycondensing said major monomer components of which hydroxy group is acylated,
wherein, the polycondensation reaction is carried out in the presence of a metal dihydrogen phosphate in an amount of 1-5000 ppm based on the total monomer components, and a liquid-crystalline polyester resin manufactured by the method and a composition comprising said resin.

11 Claims, No Drawings

METHOD FOR MANUFACTURING WHOLLY AROMATIC LIQUID-CRYSTALLINE POLYESTER RESIN

TECHNICAL FIELD

The present invention relates to a method for manufacturing wholly aromatic liquid-crystalline polyester resin which has good color tone and excellent mechanical properties and to the wholly aromatic liquid-crystalline polyester resin obtained by the method.

BACKGROUND ART

Thermotropic liquid-crystalline polyester resin (hereinafter, called liquid-crystalline polyester resin or LCP) exhibits good flowability on molding and excellent thermostability, and therefore, is widely used for manufacturing molded articles, especially electronic components having thin and small parts such as fine pitch connector. LCP also has good mechanical properties including good rigidity, excellent chemical resistance, good gas barrier properties and exhibits high dimensional accuracy. Due to those properties, LCPs are used not only for manufacturing molded articles but also for manufacturing a variety of products including fibers and films.

Among LCPs, there are semi-aromatic liquid-crystalline polyester resins and wholly aromatic liquid-crystalline polyester resins. The former has aliphatic moieties such as ethylene group and 1,4-butylene group in the molecular chain, and the latter has little or no aliphatic moieties in the molecular chain. Among them, wholly aromatic polyester resins are preferably used because of their heat resistance and good mechanical properties.

Though liquid-crystalline polyester resin has excellent properties as described above, the resin may sometimes have only insufficient mechanical properties and color tones due to high temperatures upon the polycondensing or molding step.

In order to improve mechanical properties of the liquid-crystalline polyester resin, WO01/81449 and JP 2003-160716 disclose a method for manufacturing LCP comprising copolymerizing major monomer components and low amount of minor copolymerizing component in the presence of a certain amount of alkali metal compound, wherein the minor copolymerizing component is selected from the group consisting of 4-hydroxyisophthalic acid, salicylic acid, 3-hydroxy-2-naphthoic acid and 2-hydroxynaphthalene-3,6-dicarboxylic acid. However, the method has a problem that color tone of the resin is difficult to be controlled and the obtained LCP is unsuitable for the use where coloring agents such as carbon black are not used for coloring the resin.

Because of these problems, methods which does not involve impairment of mechanical properties or color tone due to high polycondensation temperatures and thermal degradation upon molding are desired.

For example, Japanese Patent Application Laid Open No. 10-316873 discloses a method for manufacturing LCP comprising admixing a benzoxazole compound into resins in molten phase. Japanese Patent Application Laid Open No. 2-51524 discloses a method for manufacturing LCP comprising admixing organic additives such as organic phosphorous compound and hindered phenol compound into resin before polycondensation reaction is completed. In addition, Japanese Patent Application Laid Open No. H11-199761 discloses a method for manufacturing LCP which comprises admixing salts such as primary phosphate (dihydrogenphosphate) into liquid-crystalline polyester resin by the use of extruder.

With regard to semi-aromatic liquid-crystalline polyester resin, Japanese Patent Application Laid Open No. H8-53605 discloses a method comprising adding phosphorous acid or hypophosphorous acid and the metal salts thereof into resins and Japanese Patent Application Laid Open No. H8-165411 discloses a method comprising admixing non-fibrous salts such as sodium dihydrogen phosphate into resins before polycondensation is completed.

However, organic additives such as benzoxazole compound, organic phosphorous compound and hindered phenol compound can not exert sufficient effect on improving color tone because of their low thermostability and volatility. In addition, by the method comprising admixing primary phosphate (dihydrogenphosphate) into resins by extruder, LCP with good color tone and thermostability can not be stably obtained because the coloring of resins upon polycondensation can not be suppressed and small-amount of salts can not be evenly dispersed.

The method disclosed in Japanese Patent Application Laid Open No. H8-53605 which is directed to semi-aromatic liquid-crystalline-polyester resin can not be applied to a wholly aromatic liquid-crystalline polyester resin because the improvement of color tone can not be attained when the method is applied to wholly aromatic LCPs.

The method disclosed in Japanese Patent Application Laid Open No. H8-165411 has similar problems with that of Japanese Patent Application Laid Open No. H8-53605. Japanese Patent Application Laid Open No. H8-165411 also discloses a method for manufacturing a semi-aromatic liquid-crystalline polyester resin comprising the step of acylating monomers and polycondensing the monomers in the presence of non-fibrous salts such as sodium dihydrogen phosphate. However, the resulting semi-aromatic liquid-crystalline polyester resin may exhibit only poor mechanical properties such as flexural strength.

SUMMARY OF INVENTION

An object of the present invention is to provide a method for manufacturing a wholly aromatic liquid-crystalline polyester resin with good color tone and improved heat resistance and satisfactory mechanical properties.

Further object of the present invention is to provide a wholly aromatic liquid-crystalline polyester resin obtained by the method and a wholly aromatic liquid-crystalline polyester resin composition comprising the resin.

The present invention provides a method for manufacturing a wholly aromatic liquid-crystalline polyester resin, comprising the steps of:

1) acylating the hydroxy group of major monomer components selected from the group consisting of aromatic hydroxycarboxylic acid, aromatic diol and aromatic dicarboxylic acid, with an acylating agent, provided that said major monomer components comprise at least one of aromatic hydroxycarboxylic acid and aromatic diol; and
2) polycondensing said major monomer components of which hydroxy group is acylated, wherein, the polycondensing step is carried out in the presence of a metal dihydrogen phosphate in an amount of 1-5000 ppm based on the total monomer components.

The present invention also provides a wholly aromatic liquid-crystalline polyester resin obtained by the method of the invention, and a wholly aromatic liquid-crystalline polyester resin composition comprising the wholly aromatic liquid-crystalline polyester resin of the invention.

DETAILED DESCRIPTION

In the present specification and claims, "liquid-crystalline polyester resin" represents "wholly aromatic liquid-crystalline polyester resin" unless otherwise specified. The liquid-crystalline polyester resin manufactured by the method of the present invention exhibits anisotropic melt phase and is that called as thermotropic liquid-crystalline polyester resin by those skilled in the art.

The anisotropic melt phase can be confirmed by means of conventional polarized light system using orthogonal light polarizer. In more detail, by observing the sample on the hot stage under nitrogen atmosphere.

The major monomer components used in the method of the present invention are selected from the group consisting of aromatic hydroxycarboxylic acid, aromatic diol and aromatic dicarboxylic acid.

Examples of combinations of the major monomer components may include:
1) two or more aromatic hydroxycarboxylic acids;
2) one or more aromatic hydroxycarboxylic acids, one or more aromatic diols and one or more aromatic dicarboxylic acids; and
3) one or more aromatic diols and one or more aromatic dicarboxylic acids.

In a preferred embodiment, in the combinations of above 2) or 3), molar amounts of the aromatic diols and that of the aromatic dicarboxylic acids are essentially equal.

The liquid-crystalline polyester resins composed mainly of the major monomer components may or may not exhibit anisotropic melt phase depending on the monomer components, ratio of the monomers and sequence distribution of the monomers. The liquid-crystalline polyester resins of the present invention are limited to those exhibit anisotropic melt phase.

Examples of the aromatic hydroxycarboxylic acids used as major monomer components in the present invention include para-hydroxybenzoic acid, meta-hydroxybenzoic acid, salicylic acid (ortho-hydroxybenzoic acid), 6-hydroxy-2-naphthoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, and alkyl-, alkoxy- or halogen-substituted derivatives thereof as well as ester forming derivatives such as ester or acid halide derivatives thereof. Among the above, para-hydroxybenzoic acid and 6-hydroxy-2-naphthoic acid are preferable in terms of controlling properties and melting point of the resulting liquid-crystalline polyester resin.

Examples of the aromatic diols used as a major monomer component in the present invention include hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenylether, and alkyl-, alkoxy- or halogen-substituted derivatives thereof. Among the above, hydroquinone and 4,4'-dihydroxybiphenyl are preferable in terms of good reactivity of the reaction mixture during the polymerization process and good properties of the resulting liquid-crystalline polyester resin.

Examples of the aromatic dicarboxylic acids used as a major monomer component in the present invention include terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl, bis(4-carboxyphenyl)ether, bis(3-carboxyphenyl)ether and alkyl-, alkoxy- or halogen-substituted derivative thereof as well as ester forming derivatives thereof. Among the above, terephthalic acid and 2,6-naphthalene dicarboxylic acid are preferable in terms of controlling the mechanical properties, heat resistance, melting point and moldability of the resulting liquid-crystalline polyester resin.

Examples of the preferred combinations of the major monomer components may include;
a) para-hydroxybenzoic acid/6-hydroxy-2-naphthoic acid,
b) para-hydroxybenzoic acid/6-hydroxy-2-naphthoic acid/hydroquinone/2,6-naphthalenedicarboxylic acid
c) para-hydroxybenzoic acid/6-hydroxy-2-naphthoic acid/hydroquinone/terephthalic acid,
d) para-hydroxybenzoic acid/6-hydroxy-2-naphthoic acid/4,4'-dihydroxybiphenyl/2,6-naphthalenedicarboxylic acid
e) para-hydroxybenzoic acid/6-hydroxy-2-naphthoic acid/4,4'-dihydroxybiphenyl/terephthalic acid,
f) para-hydroxybenzoic acid/hydroquinone/2,6-naphthalenedicarboxylic acid,
g) para-hydroxybenzoic acid/hydroquinone/terephthalic acid,
h) para-hydroxybenzoic acid/4,4'-dihydroxybiphenyl/2,6-naphthalene dicarboxylic acid, and,
i) para-hydroxybenzoic acid/4,4'-dihydroxybiphenyl/terephthalic acid.

Among the above, combinations of a) to e), i.e. copolymers comprising para-hydroxybenzoic acid and 6-hydroxy-2-naphthoic acid as major monomer components are preferable so that controlling the melting point and moldability of the resulting resin and providing a resin with good mechanical properties.

The wholly aromatic liquid-crystalline polyester resin of the present invention may have aliphatic moiety, alicyclic moiety, amino bonding or thioester bonding unless the moiety or bonding does not impair the object of the present invention. Examples of monomers which provide such moiety or bonding to the LCP are aliphatic diols such as ethylene glycol and 1,4-butanediol, alicyclic diols such as 1,4-cyclohexanediol, 1,4-cyclohexanedimethanol, aromatic hydroxyamines such as p-aminophenol, aromatic diamines such as p-phenylenediamine, aromatic aminocarboxylic acids such as p-aminobenzoic acid, mercapto-aromatic carboxylic acids such as 4-mercapto-benzoic acid, aromatic dithiols such as 1,4-benzeneditiol and hydroxy aromatic thiols such as 4-mercapto-phenol.

The proportion of those monomers based on the total major monomer components, i.e. total amount of aromatic hydroxycarboxylic acid, aromatic diol and aromatic dicarboxylic acid is preferably no more than 5 mol % and more preferably no more than 3 mol %.

According to the method for manufacturing liquid-crystalline polyester resin of the present invention, the ester bondings among the above described monomer components are produced in the polycondensing step. The polycondensing step may be carried out along with the method known as molten acidolysis method.

In them molten acidolysis method, the monomers are heated to give molten solution and then the solution is reacted to give molten polymer. The method may be carried out under vacuum to facilitate removal of the volatile by-products such as acetic acid or water generated at the final stage of the polycondensing step.

In the method of the present invention for manufacturing liquid-crystalline polyester resin which employs the molten acidolysis method, each monomer component is firstly subjected to acylation step wherein the hydroxy, amino, mercapto groups and the like of the monomer component are acylated. According to the present invention, the acyl group having 2-5, and preferably 2-3 carbon atoms may be used in this step. Acetic ester of the monomer component is preferably prepared in the step.

Preferable acylating agents used in the acylating step of the present invention are anhydrous fatty acid with 2-5 carbon atoms. Among the anhydrous fatty acids, acetic anhydride and propionic anhydride are preferable since the boiling point of the fatty acid generated during the acylating and polycondensing steps are sufficiently low and the fatty acids are easy to distilled out during the polycondensing step.

The acylating step may be carried out by reacting the monomer components with the acylating agent at a temperature of 100-200° C., preferably 120-160° C. The molar amount of the acylating agent may be 0.8-1.5 fold, preferably 1.0-1.2 fold of the total molar amount of the hydroxy, amino and mercapto groups of the monomer components.

The duration of the acylating step may vary depending on the monomer components, volume of the reaction vessel and the like and in general, the step may be carried out for about 30 minutes to about 2 hours.

Acylating step may be continued-until at least 70 mol %, preferably at least 80 mol %, most preferably at least 90 mol % of the monomers having acylatable groups are converted to the acylated monomers. Proportion of the acylated monomers can be measured by a conventional method such as that using High Performance Liquid Chromatography or gas chromatography.

After the acylating step is terminated, the reaction mixture is subjected to the polycondensing step. The polycondensing step may be carried out in the same reaction vessel as that used in the acylating step or in another reaction vessel after transferring the acylated mixture to the vessel for polycondensing reaction.

The condition of the polycondensing step may vary depending on the monomer components, and the kind and amount of the catalysts to be used. In general, the reaction may be carried out at a temperature of 200-400° C., preferably 300-350° C. and continued until the stirring torque is reached to the predetermined level.

In order to facilitate distilling out the fatty acid generated during the reaction, the pressure of the reaction may be gradually reduced to about 100-10 Torr as the temperature is increased. Rapid pressure reduction at the initial stage of the polycondensing step should be avoided in order to prevent undesirable distillation of the unreacted monomers from the reaction system.

In the method of the present invention, a catalyst may be used in the polycondensing step, if desired.

Examples of the catalysts include organic tin compounds such as dialkyl tin oxide (ex. dibutyl tin oxide) and diaryl tin oxide; organic titanium compounds such as titanium dioxide, antimony trioxide, alkoxy titanium silicate and titanium alkoxide; alkaline or alkaline earth metal salt of carboxylic acid such as potassium acetate; salts of inorganic acid (ex. $K_2SO_4$) and gaseous acid catalysts such as Lewis acid (ex. $BF_3$) and haloganated hydrogen (ex. HCl).

The amount of the catalyst added to the reaction may preferably be 10-1000 ppm, and more preferably 20-200 ppm based on the total monomers.

In the method of the present invention for manufacturing a liquid-crystalline polyester resin, the polycondensing step is carried out in the presence of a metal dihydrogen phosphate.

The metal dihydrogen phosphate used in the method of the present invention is not limited and alkali metal dihydrogen phosphate and/or alkaline earth metal dihydrogen phosphate are preferably used in terms of mechanical properties of the resulting resin. Alkali metal dihydrogen phosphate is especially preferable in terms of good color tone of the resulting resin.

Examples of alkali metal dihydrogen phosphates include sodium dihydrogen phosphate, potassium dihydrogen phosphate and lithium dihydrogen phosphate. Among the above, sodium dihydrogen phosphate and/or potassium dihydrogen phosphate is especially preferable in terms of good color tone of the resulting resin. Hydrates of these salts may also be used.

The amount of metal dihydrogen phosphate added to the reaction is preferably 1-5000 ppm, more preferably 5-3000 ppm and most preferably 10-1000 ppm based on the total weight of the monomer components.

The metal dihydrogen phosphate should be added to the reaction system before the polycondensation step is terminated. In more detail, metal dihydrogen phosphate is preferably added before starting the polycondensing step, more preferably during the acylating step and most preferably, upon starting the acylating step so that the metal dihydrogen phosphate is evenly dispersed in the reaction mixture and coloring of the resin during the reaction is avoided. It is convenient to add the metal dihydrogen phosphate to the reaction vessel simultaneously with the major monomer components.

In one embodiment of the present invention, at least one minor copolymerizing monomer selected from the group consisting of 4-hydroxyisophthalic acid, salicylic acid, 3-hydroxy-2-naphthoic acid and 2-hydroxynaphthalene-3,6-dicarboxylic acid in an amount of 1-5000 mmol % based on the total monomers the major monomer component may be copolymerized in the presence of at least one more alkali metal salt selected from the group consisting of sulfate, carbonate, bicarbonate, nitrate, carboxylate and haloid in an amount of 10-3000 ppm of based on the total monomer components, provided that the copolymerizing monomer is not the major monomer component.

As an alkali metal salt, alkali metal sulfate, especially potassium sulfate is preferable in terms of good mechanical properties of the resulting resin. When an alkali metal salt such as sodium acetate is use as catalysts for the polycondensing step, the above amount of alkali metal salt is determined by subtracting the amount of catalyst from the total amount of the salt used for the copolymerization.

The minor copolymerizing monomer may be added to the reaction system at the start of the acylation step together with the major monomer-components.

The alkali metal salt may be added to the reaction mixture simultaneously with the metal dihydrogen phosphate as described above.

The liquid-crystalline polyester resin may be obtained from the polymerizing reaction vessel in molten state and processed to give pellets, flakes or powders. The liquid-crystalline polyester resin may be, if desired, subjected to solid phase polymerization which comprises heating the resin to 250-350° C. in substantially solid state under inert gas flow of or under reduced pressure.

The present invention further provides a liquid-crystalline polyester resin composition comprising the above-described liquid-crystalline polyester resin. The liquid-crystalline polyester resin composition obtained by admixing one or more desired additives may be used in a variety of fields.

Examples of additives which may be admixed with the liquid-crystalline polyester resin include fibrous, lamellar or particulate fillers and/or reinforcements.

Examples of fibrous fillers and/or reinforcements may include glass fiber, silica-alumina fiber, alumina fiber, carbon fiber and aramid fiber. Among them, glass fiber is preferably used because of its good balance of physical properties and cost.

Examples of lamellar or particulate fillers and/or reinforcements may include talc, mica, graphite, wollastonite, calcium carbonate, dolomite, clay, glass flake, glass beads, barium sulfate and titanium oxide.

Among the above, glass fiber is preferable because it contributes reducing cost and controlling the mechanical properties of the resulting resin.

The fillers and/or reinforcements may be added to the liquid-crystalline polyester resin composition of the present invention in an amount of 0.1-200 parts by weight, preferably 10-100 parts by weight per 100 parts by weight of the liquid-crystalline polyester resin. If the amount of the fillers and/or reinforcements is more than 200 parts by weight, the moldability of the resulting liquid-crystalline polyester resin composition tends to be decreased or the ablation of the cylinder or die of the molding device tends to be increased.

The liquid-crystalline polyester resin composition according to the present invention may further be admixed with one or more additives, which are conventionally used for resin compositions, if desired. For example, molding lubricant such as higher aliphatic acid, higher aliphatic ester, higher aliphatic amide, higher aliphatic acid metal salt (wherein, the term "higher" means 10 to 25 carbon atoms), polysiloxane and fluorocarbon resin; colorant such as dyes and pigments; antioxidant; thermal stabilizer; UV absorbent; antistatic agent; and surface active agent may be admixed. These additives may be added to the liquid-crystalline polyester resin composition of the present invention in an amount of 0.005-1 parts by weight, preferably 0.01-0.5 parts by weight per 100 parts by weight of the liquid-crystalline polyester resin.

Molding lubricants such as higher aliphatic acid, higher aliphatic ester, higher aliphatic acid metal salt or fluorocarbon-type surfactant may be added to the pellets of the liquid-crystalline polyester resin or the liquid-crystalline polyester resin composition before subjecting the pellets to the molding process, so that the agent adhere to the outer surface of the pellet.

The liquid-crystalline polyester resin composition of the present invention may comprise one or more additional resin component unless the additional resin component does not impair the object of the present invention. Examples of the additional resin components include thermoplastic resins such as polyamide, polyester, polyphenylene sulfide, polyether ketone, polycarbonate, polyphenylene ether and denatured derivatives thereof, polysulfone, polyethersulfone and polyether imide and thermosetting resins such as phenol resin, epoxy resin and polyimide resin. The amount of the additional resin component is not limited, and may be determined dependent on the intended property. Typically, such additional resins may be added to the liquid-crystalline polyester resin composition in an amount of 1-200 parts by weight, preferably 10-100 parts by weight per 100 parts by weight of the liquid-crystalline polyester resin.

The liquid-crystalline polyester resin composition used in the present invention may be obtained by adding fillers, reinforcements and other resin components to the liquid-crystalline polyester resin and melt kneading the mixture using a kneading machine such as Banbury mixer, kneader, single screw extruder, twin screw extruder or the like.

The liquid-crystalline polyester resin or the liquid-crystalline polyester resin composition obtained by the present invention may be molded using a conventional melt molding process, preferably injection molding, compression molding, extrusion molding and blow molding. The molded article obtained according to the present invention are particular useful for manufacturing parts of electric and electronic devices, machines and automobiles.

EXAMPLE

The present invention is further described in reference to the following Examples. The following examples are intended to a illustrate the invention and are not to be construed to limit the scope of the invention. In the examples, parameters were measured as follows.

<Melting Viscosity>

The measurement was carried out with capillograph, Type 1A (Toyo Seiki Seisaku-Sho, Ltd., Tokyo, Japan) using a dice of nozzle diameter of 0.7 mm and of nozzle long of 10 mm. Melting viscosity was measured at 270° C. and at a share rate of 1000 sec$^{-1}$.

<Melting Point>

The differential scanning calorimeter Exstar 6000 (Seiko Instruments Inc., Chiba, Japan) was used. LCP sample to be examined was heated at a rate of 20° C./minute and endothermic peak (Tm 1) was recorded. Thereafter, LCP sample was kept at a temperature 20-50° C. higher than Tm 1 for 10 minutes. Then the sample was cooled to room temperature at a rate of 20° C./minute and then, heated again at the same rate. Endothermic peak found in the final step was recorded as melting point.

<Whiteness>

The strip shaped bending test piece of 12.7×64 1.6 mm was molded using injection molding machine (Type M 26/15, Sumitomo Heavy-Industries, Ltd. Tokyo, Japan). L*, a* and b* value of the test strip were measured using color-difference meter (Type CR 200, MINOLTA). Whiteness value W was calculated using the L*, a* and b* values.

<Flexural Strength>

The flexural test strip of 127×3.2×12.7 mm was molded using injection molding machine (UH 1000-110, Nissei Plastic Industrial Co., Ltd., Nagano, Japan). The flexural strength test was carried out according to ASTM D 790.

<Izod Impact Value>

The bending test strip of 63.5×3.2×12.7 mm was molded using injection molding machine (UH 1000-110, Nissei Plastic Industrial Co., Ltd., Nagano, Japan). Izod impact value was measured using the test strip according to ASTM D256.

In the examples and comparative examples, following abbreviation are used.

SA: salicylic acid
HIP: 4-hydroxyisophthalic acid
BON3: 3-hydroxy-2-naphthoic acid
BON3,6: 2-hydroxynaphthalene-3,6-dicarboxylic acid
POB: para-hydroxybenzoic acid, which may contain below the detection limit (by means of high-performance liquid chromatography) of SA and HIP, and which may contain less than 1 ppm (detected by atomic absorption spectrometry) of potassium and sodium.

BON6: 6-hydroxy-2-naphthoic acid, which may contain below the detection limit (by means of high-performance liquid chromatography) of BON3 and BON3,6, and which may contain less than 1 ppm (detected by atomic absorption spectrometry) of potassium and sodium.

HQ: hydroquinone, which may contain less than 1 ppm (detected by atomic-absorption spectrometry) of potassium and sodium.

TPA: terephthalic acid, which may contain less than 1 ppm (detected by atomic absorption spectrometry) of potassium and sodium.

Example 1

POB (439 g), BON6 (193 g), HQ (123 g), TPA (191 g), potassium dihydrogen phosphate(236 mg) and acetic anhydride (679 g) were fed in a reaction container equipped with an agitating device having a torque-meter. The mixture was subjected to the de-acetate polymerizing reaction under the following condition.

<Acylating Step>

Under nitrogen atmosphere, the mixture was heated from room temperature to 140° C. over 1 hour and kept at 140° C. for 1 hour.

<Polycondensing Step>

After the acylating step was terminated, the mixture was rapidly heated to 240° C. with distilling out the by-product, acetic acid. The mixture was kept at 240° C. for 20 minutes, heated again to 350° C. over 5 hours and then, the pressure was reduced to 10 mmHg over 2 hours. When the torque became the predetermined level, the polymerization reaction was terminated. The resulting resin was removed from the container and crushed to give pellets of liquid-crystalline polyester resin. In the polycondensing step, approximately theoretical amount of acetic acid was distilled out.

The whiteness of the resulting liquid-crystalline polyester resin was 83.4. The whiteness, melting viscosity, melting point, flexural strength, Izod impact value of the liquid-crystalline polyester resin are shown in Table 1-1.

Comparative Example 1

Liquid-crystalline polyester resin pellet was prepared in the same manner as example 1 except for potassium dihydrogen phosphate was not added. In the polycondensing step, approximately theoretical amount of acetic acid was distilled out.

The whiteness of the resulting liquid-crystalline polyester resin was 80.4. The whiteness, melting viscosity, melting point, flexural strength, Izod impact value of the liquid-crystalline polyester resin are shown in Table 1-1.

Example 2

POB (504 g), BON6 (254 g), potassium dihydrogen phosphate (190 mg) and acetic anhydride (526 g) were fed in a reaction container equipped with an agitating device having a torque-meter. SA (210 mg, 30 mmol % based on the total monomers), HIP (90 mg, 10 mmol % based on the total monomers) and potassium sulfate (300 mg, 400 ppm based on the total monomers) were added thereto. The mixture was subjected to the de-acetate polymerizing reaction under the following condition.

<Acylating Step>

Under nitrogen atmosphere, the mixture was heated from the room temperature to 180° C. over 2.5 hours and kept at 180° C. for 1 hour.

<Polycondensing Step>

After the acylating step was terminated, the mixture was heated to 330° C. over 3.5 hours with distilling out the by-product, acetic acid. Then, the pressure was reduced to 100 mmHg over 1 hour. When the torque became the predetermined level, vacuum was stopped and the pressure of the reaction was returned to the atmospheric pressure. The resulting resin was removed from the container and crushed to give pellets of the liquid-crystalline polyester resin. In the polycondensing step, approximately theoretical amount of acetic acid was distilled out.

The whiteness of the resulting liquid-crystalline polyester resin was 88.9. The whiteness, melting viscosity, melting-point, flexural strength, Izod impact value of the liquid-crystalline polyester resin are shown in Table 1-1.

Comparative Example 2

Liquid-crystalline polyester resin pellet was prepared in the same manner as example 2 except for potassium dihydrogen phosphate was not added. In the polycondensing step, approximately theoretical amount of acetic acid was distilled out.

The whiteness of the resulting liquid-crystalline polyester resin was 86,8. The whiteness, melting viscosity, melting point, flexural strength, Izod impact value of the liquid-crystalline polyester resin are shown in Table 1-1.

Example 3

Liquid-crystalline polyester resin pellet was prepared in the same manner as example 2 except for BON 3 (6.7 g, 700 mmol based on the total monomers) and BON 3,6 (5.9 g, 500 mmol based on the total monomers) were used instead of SA and HIP, and the amount of potassium sulfate was adjusted to 155 mg (200 ppm based on the total monomers). In the polycondensing step, approximately theoretical amount of acetic acid was distilled out.

The whiteness of the resulting liquid-crystalline polyester resin was 85.7. The whiteness, melting viscosity, melting point, flexural strength, Izod impact value of the liquid-crystalline polyester resin are shown in Table 1-1.

Comparative Example 3

Liquid-crystalline: polyester resin pellet was prepared in the same manner as example 3 except for potassium dihydrogen phosphate was not added. In the polycondensing step, approximately theoretical amount of acetic acid was distilled out.

The whiteness of the resulting liquid-crystalline polyester resin was 82.5. The whiteness, melting viscosity, melting point, flexural strength, Izod impact value of the liquid-crystalline polyester resin are shown in Table 1-1.

Example 4

Liquid-crystalline polyester resin pellet was prepared in the same manner as example 2 except for sodium dihydrogen phosphate (190 mg) was used instead of potassium dihydrogen phosphate (190 mg). In the polycondensing step, approximately theoretical amount of acetic acid was distilled out.

The whiteness of the resulting liquid-crystalline polyester resin was 88.0. The whiteness, melting viscosity, melting point, flexural strength, Izod impact value of the liquid-crystalline polyester resin are shown in Table 1-2.

Comparative Example 4

Liquid-crystalline polyester resin pellet was prepared in the same manner as example 2 except for dipotassium hydrogen phosphate (380 mg) was used instead of potassium dihydrogen phosphate (190 mg). In the polycondensing step, approximately theoretical amount of acetic acid was distilled out.

The whiteness of the resulting liquid-crystalline polyester resin was 88.3. The whiteness, melting viscosity, melting point, flexural strength, Izod impact value of the liquid-crystalline polyester resin are shown in Table 1-2.

The resulting liquid-crystalline polyester resin exhibited good whiteness but relatively poor mechanical properties such as slightly lower flexural strength and low Izod impact value.

Comparative Example 5

Liquid-crystalline polyester resin pellet was prepared in the same manner as example 2 except for tripotassium phosphate (380 mg) was used instead of potassium dihydrogen phosphate (190 mg). In the polycondensing step, approximately theoretical amount of acetic acid was distilled out.

The whiteness of the resulting liquid-crystalline polyester resin was 87.2. The whiteness, melting viscosity, melting point, flexural strength, Izod impact value of the liquid-crystalline polyester resin are shown in Table 1-2.

The resulting liquid-crystalline polyester resin exhibited good whiteness but relatively poor mechanical properties including lower flexural strength and Izod impact value.

Comparative Example 6

Liquid-crystalline polyester resin pellet was prepared in the same manner as example 2 except for phosphorous acid (190 mg) was used instead of potassium dihydrogen phosphate (190 mg). In the polycondensing step, approximately theoretical amount of acetic acid was distilled out.

The whiteness of the resulting liquid-crystalline polyester resin was 79.0. The whiteness, melting viscosity, melting point, flexural strength, Izod impact value of the liquid-crystalline polyester resin are shown in Table 1-2.

The resulting liquid-crystalline polyester resin exhibited relatively low whiteness which provides poor color tone.

Comparative Example 7

Liquid-crystalline polyester resin pellet was prepared in the same manner as example 2 except for potassium hypophosphite (190 mg) was used instead of potassium dihydrogen phosphate (190 mg). In the polycondensing step, approximately theoretical amount of acetic acid was distilled out.

The whiteness of the resulting liquid-crystalline polyester resin was 79.6. The whiteness, melting viscosity, melting point, flexural strength, Izod impact value of the liquid-crystalline polyester resin are shown in Table 1-2.

The resulting liquid-crystalline polyester resin exhibited relatively low whiteness which provides poor color tone.

Comparative Example 8

The acylating and polycondsnsing steps were carried out in the same manner as example 2 except for ammonium dihydrogen phosphate (190 mg) was used instead of potassium dihydrogen phosphate (190 mg). In the polycondensing step, the viscosity of the reaction mixture was not enough increased and the torque was not reached to the predetermined level. Accordingly, no liquid-crystalline polyester resin was obtained.

Example 5

Liquid-crystalline polyester resin pellet was prepared in the similar manner as example 2 except for after the torque became the predetermined level, the molten state reaction mixture was kept in nitrogen atmosphere under the ambient pressure and 330° C. for 50 minutes.

Then, the resulting resin was removed from the container and crushed to give pellets of liquid-crystalline polyester resin. In the polycondensing step, approximately theoretical amount of acetic acid was distilled out.

The melt viscosity of the resulting liquid-crystalline polyester resin was 21 Pa·s and the melting point measured by DSC was 282° C. The whiteness of the resin was 88.3. The whiteness, flexural strength, Izod impact value of the liquid-crystalline polyester resin are shown in Table 2.

Comparative Example 9

Liquid-crystalline polyester resin pellet was prepared in the similar manner as example 5 except for the addition of potassium dihydrogen phosphate (190 mg) was conducted after the torque became the predetermined level in the polycondensing step. Then, the molten state reaction mixture was kept in nitrogen atmosphere at the ambient pressure and 330° C. for 50 minutes. The resulting resin was removed from the container and crushed to give pellets of liquid-crystalline polyester resin. In the polycondensing step, approximately theoretical amount of acetic acid was distilled out.

The melt viscosity of the resulting liquid-crystalline polyester resin was 18 Pa·s and the melting point measured by DSC was 281° C. The whiteness of the resin was 84.8. The whiteness, flexural strength, Izod impact value of the liquid-crystalline polyester resin are shown in Table 2.

Comparative Example 10

Liquid-crystalline polyester resin pellet was prepared in the similar manner as example 5 except for potassium dihydrogen phosphate (190 mg) was not added. After the torque of the reaction mixture was achieved to the predetermined level, the molten state reaction mixture was kept in nitrogen atmosphere at the ambient pressure and 330° C. for 50 minutes. The resulting resin was removed from the container and crushed to give pellets of liquid-crystalline polyester resin. In the polycondensing step, approximately theoretical amount of acetic acid was distilled out.

The melt viscosity of the resulting liquid-crystalline polyester resin was 22 Pa·s and the melting point measured by DSC was 282° C. The whiteness of the resin was 80.9. The whiteness, flexural strength, Izod impact value of the liquid-crystalline polyester resin are shown in Table 2.

In Table 1-1 and Table 1-2, the abbreviations represent additives as follows:
A: potassium dihydrogen phosphate
B: sodium dihydrogen phosphate
C: dipotassium hydrogen phosphate
D: tripotassium phosphate
E: phosphorous acid
F: potassium hypophosphate

TABLE 1-1

| | Example 1 | Comparative example 1 | Example 2 | Comparative example 2 | Example 3 | Comparative example 3 |
|---|---|---|---|---|---|---|
| monomers(mol %) | | | | | | |
| POB | 51.4 | 51.4 | 73 | 73 | 73 | 73 |
| BON6 | 11.9 | 11.9 | 27 | 27 | 27 | 27 |
| HQ | 18.1 | 18.1 | — | — | — | — |
| TPA | 18.6 | 18.6 | — | — | — | — |
| minor copolymerizing component(mmol %) | | | | | | |
| SA | — | — | 30 | 30 | — | — |
| HIP | — | — | 10 | 10 | — | — |
| BON3 | — | — | — | — | 700 | 700 |
| BON3, 6 | — | — | — | — | 500 | 500 |
| Potassium sulfate(ppm) | — | — | 400 | 400 | 200 | 200 |
| additives | A | | A | | A | |
| Amount of the additive(ppm) | 265 | — | 250 | — | 250 | — |
| melting viscosity(Pa · s) | 19 | 18 | 23 | 22 | 21 | 20 |
| melting point(° C.) | 329 | 328 | 282 | 281 | 280 | 280 |
| whiteness | 83.4 | 80.4 | 88.9 | 86.8 | 85.7 | 82.5 |
| flexural strength(MPa) | 170 | 168 | 162 | 160 | 164 | 158 |
| Izod impactvalue(J/m) | 612 | 535 | 526 | 480 | 433 | 388 |

TABLE 1-2

| | Example 4 | Comparative example 4 | Comparative example 5 | Comparative example 6 | Comparative example 7 |
|---|---|---|---|---|---|
| Monomers(mol %) | | | | | |
| POB | 73 | 73 | 73 | 73 | 73 |
| BON6 | 27 | 27 | 27 | 27 | 27 |
| HQ | — | — | — | — | — |
| TPA | — | — | — | — | — |
| minor copolymerizing component(mmol %) | | | | | |
| SA | 30 | 30 | 30 | 30 | 30 |
| HIP | 10 | 10 | 10 | 10 | 10 |
| BON3 | — | — | — | — | — |
| BON3, 6 | — | — | — | — | — |
| Potassium sulfate(ppm) | 400 | 400 | 400 | 400 | 400 |
| Additive | B | C | D | E | F |
| Amount of the additive(ppm) | 250 | 500 | 500 | 250 | 250 |
| melting viscosity(Pa · s) | 28 | 28 | 19 | 22 | 22 |
| melting point(° C.) | 282 | 284 | 282 | 281 | 281 |
| whiteness | 88.0 | 88.3 | 87.2 | 79.0 | 79.6 |
| flexural strength(MPa) | 167 | 152 | 146 | 152 | 138 |
| Izod impact value(J/m) | 722 | 187 | 78 | 626 | 121 |

TABLE 2

| | Example 2 | Comparative example 2 | Example 5 | Comparative example 9 | Comparative example 10 |
|---|---|---|---|---|---|
| potassium dihydrogen phosphate(ppm) | 250 | — | 250 | 250 | — |
| Potassium dihydrogen phosphate was added at | at the start of the acylating step | | at the start of the acylating step | after the polycondensing step was terminated | — |
| After the polycondensing step, the mixture was kept at 330° C. for | 0 minute | 0 minute | 50 minutes | 50 minutes | 50 minutes |
| whiteness | 88.9 | 86.8 | 88.3 | 84.8 | 80.9 |
| flexural strength(MPa) | 162 | 160 | 164 | 160 | 156 |
| Izod impact value(J/m) | 526 | 480 | 518 | 504 | 444 |

In the examples and comparative examples shown in table 2, POB/BON6 in the ratio of 73/27 (mol %) were used as major monomer components, and SA 30 mmol % and HIP 10 mmol % were used as minor copolymerizing monomers and the monomers were co-polymerized or polycondensed in the presence of potassium sulfate 400 ppm based on the total monomers to give the liquid-crystalline polyester resins.

What is claimed is:

1. A method for manufacturing a wholly aromatic liquid-crystalline polyester resin comprising the steps of:
   1) acylating the hydroxy group of major monomer components selected from the group consisting of aromatic hydroxycarboxylic acid, aromatic diol and aromatic dicarboxylic acid, with an acylating agent, provided that said major monomer components comprise at least one of aromatic hydroxycarboxylic acid and aromatic diol; and
   2) polycondensing said major monomer components of which hydroxy group is acylated,
   wherein, the polycondensation reaction is carried out in the presence of a metal dihydrogen phosphate in an amount of 1-5000 ppm based on the total monomer components.

2. The method according to claim 1, wherein the metal dihydrogen phosphate is added to the reaction system in the acylating step 1).

3. The method according to claim 1, wherein the metal dihydrogen phosphate is an alkali metal dihydrogen phosphate.

4. The method according to claim 3, wherein the alkali metal dihydrogen phosphate is potassium dihydrogen phosphate and/or sodium dihydrogen phosphate.

5. The method according to claim 1, wherein the major monomer components comprise para-hydroxybenzoic acid and/or 6-hydroxy-2-naphthoic acid.

6. The method according to claim 1, wherein the polycondensing step is carried out in the presence of a minor copolymerizing component selected from the group consisting of 4-hydroxyisophthalic acid, salicylic acid, 3-hydroxy-2-naphthoic acid and 2-hydroxynaphthalene-3,6-dicarboxylic acid in an amount of 1-5000 mmol % based on the total monomer components, and an alkali metal salt selected from the group consisting of sulfate, carbonate, bicarbonate, nitrate, carboxylate and haloid of an alkali metal in an amount of 10-3000 ppm based on the total monomer components.

7. The method according to claim 6, wherein the alkali metal salt is an alkali metal sulfate.

8. A wholly aromatic liquid-crystalline polyester resin obtainable by the method according to claim 1.

9. A wholly aromatic liquid-crystalline polyester resin composition comprising 100 parts by weight of wholly aromatic liquid-crystalline polyester resin according to claim 8 and 0.1-200 parts by weight of a filler and/or reinforcement.

10. The wholly aromatic liquid-crystalline polyester resin composition according to claim 9, wherein the filler and/or reinforcement is at least one selected from the group consisting of glass fiber, silica-alumina fiber, alumina fiber, carbou fiber, aramid fiber, talc, mica, graphite, wollastonite, calcium carbonate, dolomite, clay, glass flake, glass beads, barium sulfate and titanium oxide.

11. The wholly aromatic liquid-crystalline polyester resin composition according to claim 10, wherein the filler and/or reinforcement is glass fiber.

* * * * *